Patented May 28, 1935

2,002,939

UNITED STATES PATENT OFFICE 2,002,939

STENCIL AND MARKING INK

William Ernest, Martinez, Calif., assignor of one-half to Emanuel H. Baer, Associated, Calif.

No Drawing. Application February 14, 1934, Serial No. 711,223

1 Claim. (Cl. 134—32)

My invention relates to ink especially adapted for stenciling and marking, although it may be used to advantage for other purposes.

The principal objects of the invention are to provide an ink which dries quickly, which is insoluble in water, gasoline, oils or greases, and which will flow smoothly and not clog the stencil or stiffen the brush. The insolubility of my ink makes it peculiarly valuable for marking articles and packages for shipment, where there is a possibility of exposure to water, and for marking gasoline and oil drums and boxes, where any leakage would efface the marking if done with oil-soluble ink. Other objects and advantages of the invention will suggest themselves to those skilled in the art.

The invention will be described fully in the following specification, which should be read with the understanding that changes, within the scope of the appended claim, may be made in the character and proportions of the several ingredients, and in the method of mixing them, without departing from the spirit of the invention as defined in said claim.

My ink may be made in any of the hues of the rainbow or spectrum, or in any tint produced by the blending of these hues; loosely, any hue including black and white.

It may be made black, with lampblack as the pigment; or it may be colored, that is, given other hues or tints, including white with some suitable finely pulverized pigment.

The base of my ink consists of shellac, turpentine, and beeswax; to which base is added a pigment, and alcohol as a thinner and drier. I prefer to use liquid shellac known commercially as "Orange No. 1", pure spirits of turpentine, and denatured alcohol known commercially as "No. 1 formula", although other similar grades may be used.

In mixing the ingredients, I first dissolve the wax in the turpentine at a temperature of from 150° F. to 180° F., and add the shellac. If dry gum shellac is used instead of liquid shellac, it should first be dissolved in alcohol, in the approximate proportions of 10 ounces avdp. of dry gum shellac to 21⅓ fluid ounces of alcohol, which will make the quantity of liquid shellac specified in the formulae hereinafter given. The pigment is then thoroughly stirred in to the shellac-turpentine-beeswax base to make a smooth creamy mass, which is finally thinned to the desired consistency with the alcohol. The mixture should be kept hot during the mixing process, to prevent separation, but after being once thoroughly mixed, it can be allowed to cool and can be stored for an indefinite time. If the pigment settles, it can be restored to suspension by stirring or shaking, without the necessity for re-heating.

The use of shellac, turpentine and beeswax as the base, with alcohol as the thinner, makes a smooth flowing homogeneous ink that is quick drying and insoluble in water, gasoline or oil, even immediately after being applied.

The proportions of shellac, turpentine, and wax for best results are as follows:—

Liquid shellac, 32 fluid ounces.
Turpentine, 5⅓ to 6 fluid ounces.
Beeswax, 2 to 2⅓ fluid ounces.

The amounts of pigment and alcohol vary with the character of the pigment. Inasmuch as alcohol is the cheapest ingredient it is desirable to use as little pigment, and as much alcohol as possible without sacrificing covering quality. I have found the following formulae to be satisfactory:—

For black ink:

| | Vol. per cent |
|---|---|
| Liquid shellac, 32 fluid ounces | 15.00 |
| Turpentine, 5⅓ fluid ounces | 2.50 |
| Beeswax, 2⅓ fluid ounces | 1.25 |
| Lampblack, 5⅔ fluid ounces | 2.85 |
| Alcohol, 167 fluid ounces | 78.40 |
| | 100.00 |

For red or yellow ink, using para-red or chrome yellow pigments:—

| | |
|---|---|
| Liquid shellac, 32 fluid ounces | 25.00 |
| Turpentine, 6 fluid ounces | 4.69 |
| Beeswax, 2 fluid ounces | 1.56 |
| Pigment, 8 fluid ounces | 6.25 |
| Alcohol, 80 fluid ounces | 62.50 |
| | 100.00 |

For white ink, using titanium dioxide as pigment:

| | |
|---|---|
| Liquid shellac, 32 fluid ounces | 25.00 |
| Turpentine, 6 fluid ounces | 4.69 |
| Beeswax, 2 fluid ounces | 1.56 |
| Pigment, 6 fluid ounces | 3.13 |
| Alcohol, 82 fluid ounces | 65.62 |
| | 100.00 |

The quantities herein given will make approximately 1⅔ gallons of black ink, and 1 gallon of the other colors. The proportions stated can be varied at least 5% without impairing the quality of the product, and even more without destroying its usefulness.

I claim:

A stencil and marking ink consisting of approximately 32 fluid ounces of liquid shellac, 5⅓ to 6 fluid ounces of turpentine, 2 to 2⅓ fluid ounces of beeswax, 5⅔ to 8 fluid ounces of pigment, and 80 to 167 fluid ounces of alcohol.

WILLIAM ERNEST.